(12) United States Patent
Houston et al.

(10) Patent No.: US 8,448,957 B1
(45) Date of Patent: May 28, 2013

(54) SULKY APPARATUS

(76) Inventors: Steve R. Houston, Germantown, MD (US); Thomas Russell Stokes, Stevensville, MD (US); Warren David Litchfield, Laurel, MD (US)

(*) Notice: Subject to any disclaimer, the term of this patent is extended or adjusted under 35 U.S.C. 154(b) by 272 days.

(21) Appl. No.: 12/928,541

(22) Filed: Dec. 15, 2010

(51) Int. Cl.
*B62D 51/02* (2006.01)
*E02F 9/20* (2006.01)

(52) U.S. Cl.
CPC .............. *B62D 51/02* (2013.01); *E02F 9/2004* (2013.01)
USPC ........... 280/32.7; 280/494; 280/498; 280/204

(58) Field of Classification Search
CPC ................................. B62D 61/02; E02F 9/2004
USPC ............. 280/14.7, 32.5, 32.7, 204, 493, 494, 280/498; 56/14.7
See application file for complete search history.

(56) References Cited

U.S. PATENT DOCUMENTS

| 4,828,282 | A  | * | 5/1989  | Pinto ............................ 280/32.7 |
| 5,004,251 | A  | * | 4/1991  | Velke et al. .................. 280/32.7 |
| 5,575,140 | A  | * | 11/1996 | Bermes et al. ................. 56/14.7 |
| 6,145,855 | A  | * | 11/2000 | Bellis, Jr. ..................... 280/32.7 |
| 6,485,036 | B1 | * | 11/2002 | Bricko .......................... 280/32.7 |
| 6,692,010 | B1 | * | 2/2004  | Johnson et al. .............. 280/32.7 |
| 7,976,042 | B2 | * | 7/2011  | Watson et al. ................ 280/166 |

\* cited by examiner

*Primary Examiner* — J. Allen Shriver, Jr.
*Assistant Examiner* — Brian Cassidy
(74) *Attorney, Agent, or Firm* — Michael W. York

(57) ABSTRACT

Sulky apparatus for use behind a self-propelled machine including sulky operator riding apparatus for supporting an operator behind a self-propelled machine that the sulky apparatus is attached to, an upward extending control column adapted to be located near the operator controls for the self-propelled machine, a deployment boom attached to the sulky operator riding apparatus for deploying the sulky operator riding apparatus having a lower portion pivotally attached to the control column for deploying and for retracting the sulky operator riding apparatus to a stored position, and sulky apparatus control apparatus for controlling the operation of the sulky apparatus deployment boom. The control apparatus includes a gas filled cylinder and a chain.

10 Claims, 6 Drawing Sheets

SULKY APPARATUS

BACKGROUND OF THE INVENTION

Sulky apparatus for use with self-propelled machinery such as self-propelled lawn mowers have been in use for sometime and they allow the operator of self-propelled machinery to operate the machinery much more efficiently and allow much more to be accomplished with the machinery than was possible prior to such sulky apparatus. Typically, the sulky apparatus included a platform for the operator to stand upon and some type of boom that was attached to the operator platform at one end and to the self-propelled machinery at the other end of the boom. Some means for storing the sulky apparatus, such as a hook and chain was also provided to store the sulky apparatus when it was not in use. However, even with such sulky apparatus, the operator had to deploy the sulky apparatus manually plus it had to be stored in a position by hooking it into an out of the way position or the like. This need for manual deployment and storage of the sulky apparatus was inconvenient and time consuming and greatly reduced the operator's efficiency and work performance.

Such manually operated sulky apparatus have been improved by the addition of an energy storing member that provides for automatic retraction of the sulky apparatus operator riding platform and hence eliminates some of the manual work associated with the use of the sulky apparatus. An example of such a sulky apparatus is set forth in U.S. Pat. No. 5,575,140. Even with such an energy storing device, present sulky apparatus lack the ability to readily be adjustable to operate efficiently on different types of terrain and to be adjustable for different size operators, different operational modes and for different types of self-propelled machinery. Moreover, present sulky apparatus lack safety or protective features to protect an operator riding on the sulky apparatus riding platform in the event of a sudden unexpected stop such as when the self-propelled machinery hits an object which is quite common during the operation of most self-propelled machinery.

The present sulky apparatus invention overcomes these deficiencies present in the prior art sulky apparatus and provides sulky apparatus that allows the operator to have a sulky apparatus that is adaptable to various types of terrain and types and makes of self-propelled machinery. Also, present sulky apparatus invention allows the operator to select the position of the sulky apparatus riding platform to suit the operator's size and preferences. The operator is also able to readily select an automatic retraction mode or a continuously deployed mode for the sulky apparatus riding platform and this allows the operator to operate the present sulky apparatus invention in a much more efficient and productive manner.

SUMMARY OF THE INVENTION

This invention relates to sulky apparatus and more particularly to improved sulky apparatus that allows the operator of the sulky apparatus to control the manner in which the sulky apparatus is operated.

It is accordingly an object of the present invention to provide sulky apparatus with multiple capabilities.

It is an object of the present invention to provide sulky apparatus that has different modes of operation.

It is an object of the present invention to provide sulky apparatus that allows the operator of the sulky apparatus to select the mode of operation best suited for the intended operation of the associated self-propelled machinery.

It is an object of the present invention to provide sulky apparatus that allows the operator of the sulky apparatus to select the desired position for the sulky riding platform.

It is an object of the present invention to provide sulky apparatus that allows the operator of the sulky apparatus to select the desired deployed position for the sulky riding platform.

It is an object of the present invention to provide sulky apparatus that allows the operator of the sulky apparatus to select the desired deployed position for the sulky riding platform based upon the desired operation of the attached self-propelled machinery.

It is an object of the present invention to provide sulky apparatus that allows the operator of the sulky apparatus to select the desired deployed position for the sulky riding platform based upon the size of the operator.

It is an object of the present invention to provide sulky apparatus that allows the operator of the sulky apparatus to select the desired deployed position for the sulky riding platform based upon the size and shape of the attached self-propelled machinery.

It is an object of the present invention to provide sulky apparatus adapted to be used with multiple types of self-propelled machines.

It is an object of the present invention to provide sulky apparatus that is easy to operate by the operator of the sulky apparatus.

It is an object of the present invention to provide sulky apparatus that does not distract the operator of the sulky apparatus from the operation of the attached self-propelled machinery.

It is an object of the present invention to provide sulky apparatus that has the controls for the sulky apparatus located near the controls for the attached self-propelled machinery.

It is an object of the present invention to provide sulky apparatus that is easy to move to a stored position.

It is an object of the present invention to provide sulky apparatus that has multiple storage positions.

It is an object of the present invention to provide sulky apparatus that is safe to use.

It is an object of the present invention to provide sulky apparatus that has protection for the operator of the sulky apparatus.

It is an object of the present invention to provide sulky apparatus that protects the operator from sudden impact of the self-propelled machinery with an object.

It is an object of the present invention to provide sulky apparatus that is easy to service.

It is an object of the present invention to provide sulky apparatus that is easy to disassemble.

It is an object of the present invention to provide sulky apparatus that is easy to repair.

It is an object of the present invention to provide sulky apparatus that has few moving parts to wear out.

These and other objects of the invention will be apparent from the following described sulky apparatus invention that includes sulky operator riding means for supporting an operator behind a self-propelled machine that the sulky apparatus is attached to, sulky apparatus deployment means attached to the sulky operator riding means for deploying the sulky operator riding means to the operational position for the sulky operator riding means and for retracting the sulky operator riding means to a stored position, and sulky apparatus control means for controlling the operation of the sulky apparatus deployment means. The operator riding means includes wheel and a wheel cover assembly and an operator riding platform that extends outward from the wheel cover assembly. The sulky apparatus deployment means includes an adjustable deployment boom that is pivotally connected at the outer end portion to the operator riding means and the control means includes energy storing means that includes a gas filled cylinder and as well as chain for deploying the operator riding means at various vertical locations. The sulky apparatus invention includes provisions for storing the operator riding means in two different positions.

BRIEF DESCRIPTION OF THE DRAWINGS

The invention will be hereinafter more completely described with reference to the accompanying drawings in which.

DETAILED DESCRIPTION OF THE PREFERRED EMBODIMENT

Figure 1:
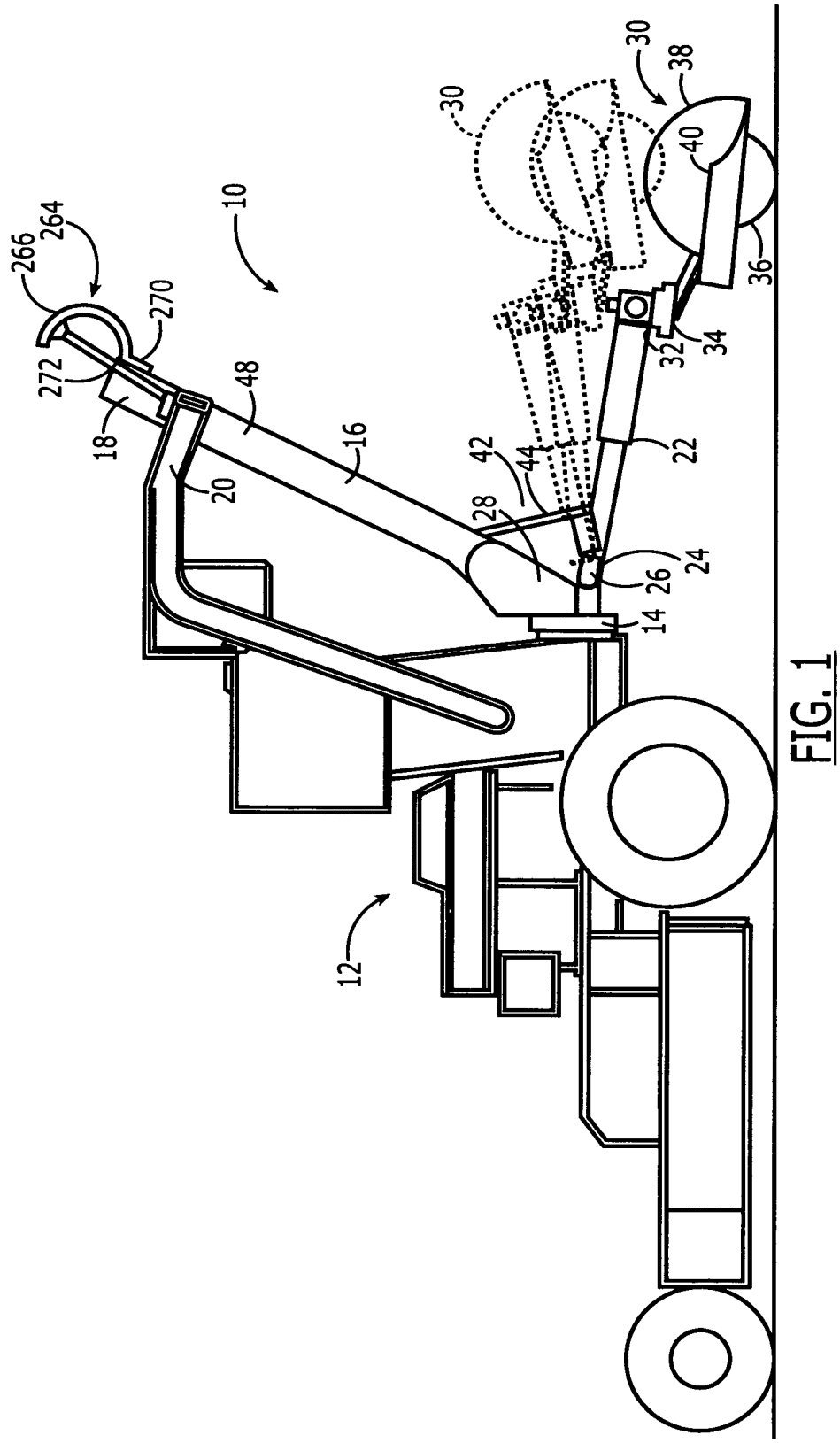
FIG. 1 is a side elevational view of the sulky apparatus invention attached to a self-propelled lawn mower and illustrating the sulky apparatus multiple deployment positioning capability.

Referring first to FIG. 1, the sulky apparatus invention is illustrated and is designated generally by the number 10. The sulky apparatus invention 10 is illustrated connected to a self-propelled lawnmower that is designated generally by the number 12 by a conventional connecting apparatus 14. The lawn mower 12, in its self, forms no part of the present invention 10 and is conventional in design. The sulky apparatus invention 10 comprises a housing and control column 16 that is configured to be attached to the connecting apparatus 14 in such a manner that the housing and control column 16 projects upward from the connecting apparatus 14 so that the upper end portion 18 of the housing and control column 16 is located in the vicinity of the control handles 20 (only one of which is illustrated) of the lawn mower 12 to give the operator of the lawn mower 12 and the sulky apparatus 10 easy access to the upper end portion 18 of the housing and control column 16. The sulky apparatus 10 also comprises a deployment boom 22 that is pivotally connected at its inner end 24 by a pivot pin 26 to the lower end portion 28 of the housing and control column 16. The sulky apparatus 10 also comprises operator riding means 30 for permitting an operator to ride behind the lawn mower 12 or the like. This operator riding means 30 is pivotally connected to the outer end portion 32 of the deployment boom 22 by a pivot assembly 34 connected to the boom end portion 32. The operator riding means 30 comprises a wheel 36 and a wheel cover assembly 38 and an operator riding platform 40 extending outward from the wheel cover assembly 38 as best illustrated in FIG. 2.

Figure 2:
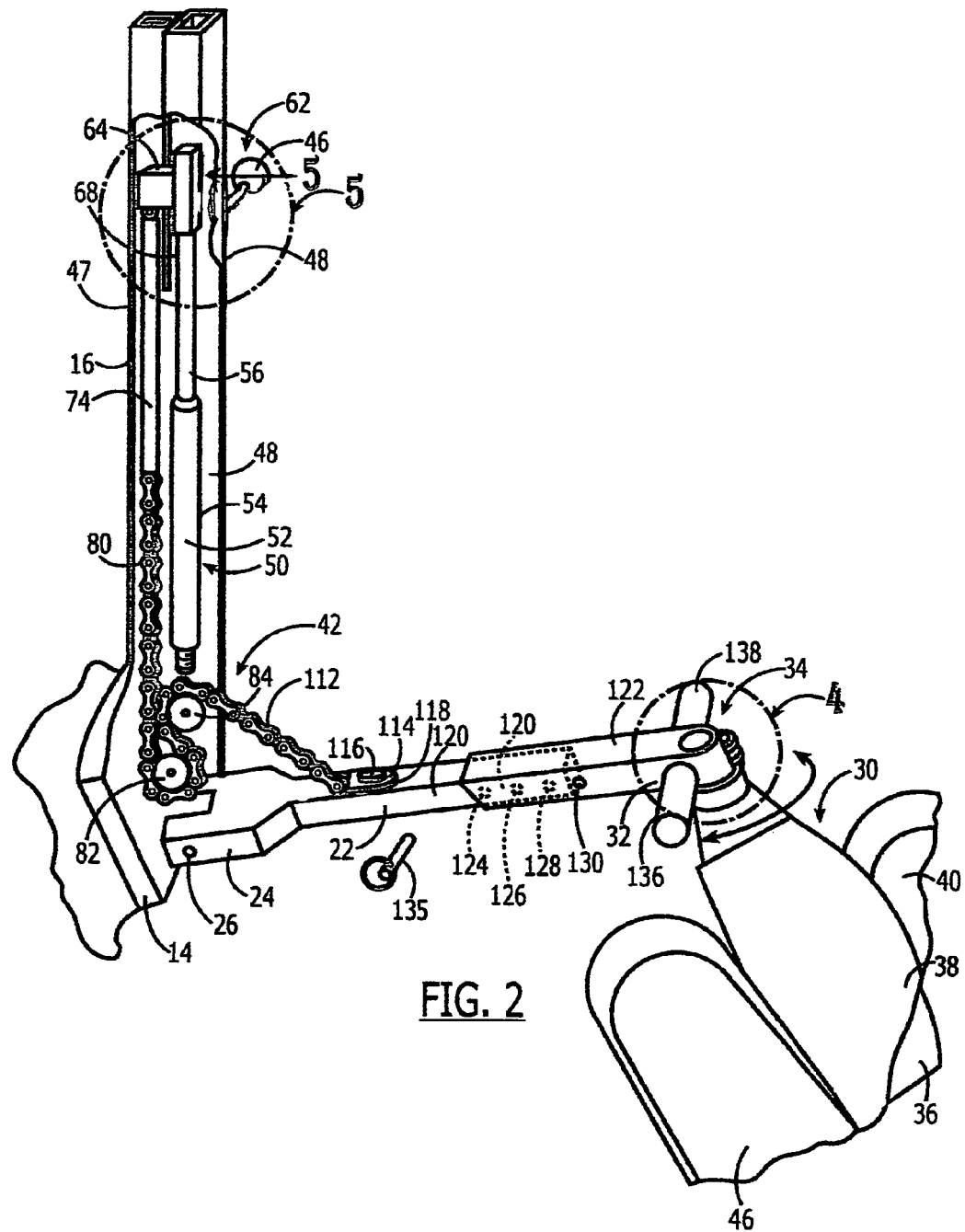
FIG. 2 is an enlarged perspective view of the sulky apparatus invention set forth in FIG. 1 with certain portions thereof removed to show how the interior parts function and illustrating how the riding platform and associated wheel structure rotates.

As illustrated in FIGS. 1 and 2, the sulky apparatus 10 also comprises control means 42 for controlling the positioning of the deployment boom 22 and the attached operator riding means 30. This control means 42 includes retraction chain means 44 including a chain 80 and the control handle 46 as well as numerous other components that will be herein after described in detail. The control means 42 allows the operator to control the position of the deployment boom 22 and the attached operator riding means 30 as illustrated in FIG. 1 by the dashed lines showing various positions for the boom 22 and the attached operator riding means 30. FIG. 2 illustrates further details of the control means 42 that allows the operator to control the position of the deployment boom 22 and the attached operator riding means 30. As illustrated in FIG. 2, portions of the of the housing and control column 16 have been removed to show important components of the control means 42 that are located within the housing and control column 16. As illustrated in FIG. 2, the housing and control column 16 is manufactured from two elongated hollow rectangular cross section aluminum members 47 and 48. The elongated hollow member 48 that is located closest to the operator riding means 30 has a larger hollow rectangular cross section than the other elongated hollow member 47. The elongated hollow rectangular cross section aluminum members 47 and 48 are welded together to form the housing and control column 16.

Figure 3:
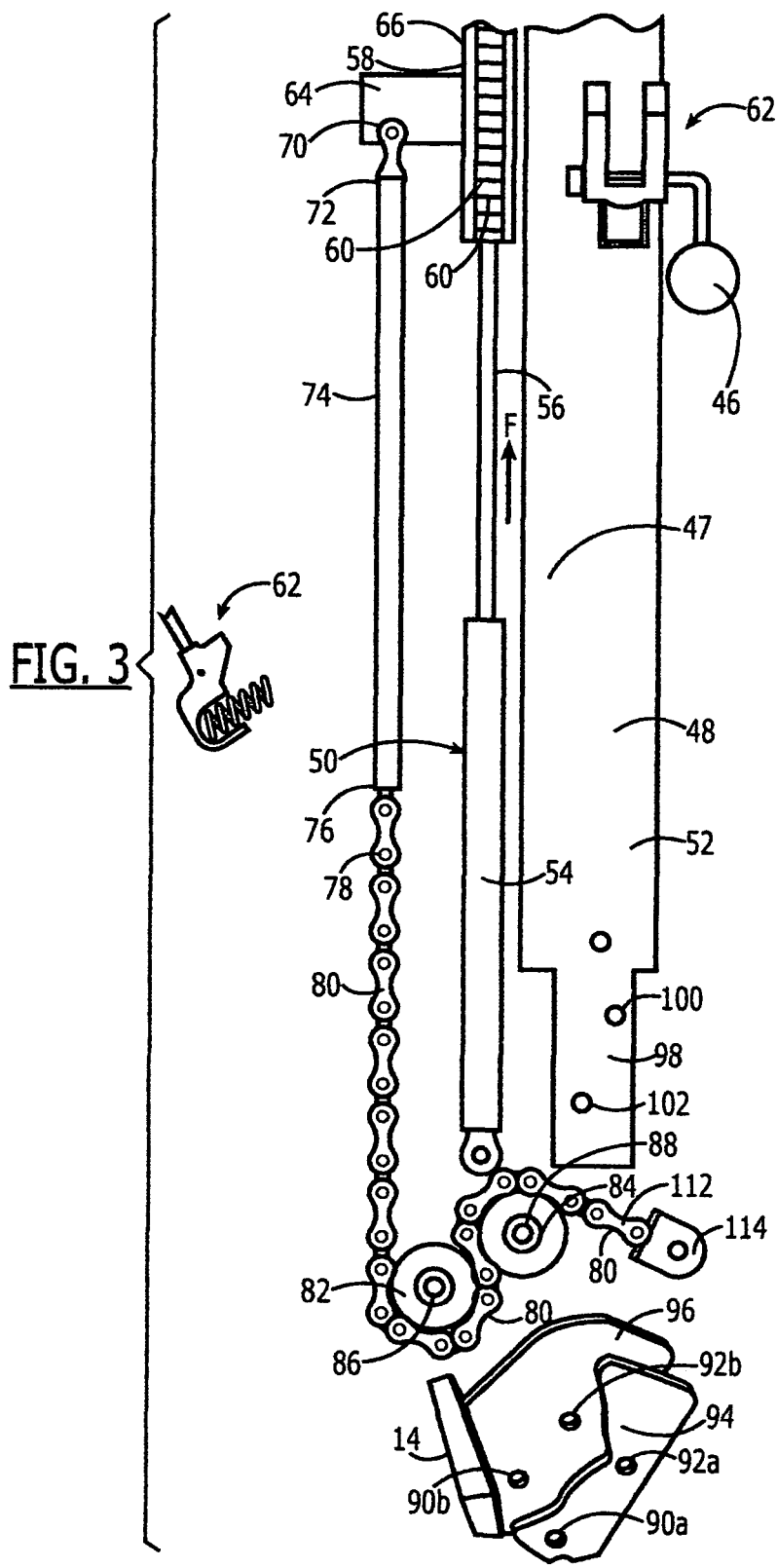
FIG. 3 is an enlarged disassembled view with certain parts broken away of a portion of the structure illustrated in FIG. 2 illustrating the internal components in further detail.

FIG. 2 illustrates the arrangement of the various components in the elongated hollow rectangular cross section aluminum members 47 and 48 and FIG. 3 also illustrates the same members when they have been disassembled from the elongated hollow rectangular cross section aluminum members 47 and 48. As illustrated in FIGS. 2 and 3, the elongated hollow rectangular cross section aluminum member 48 contains energy storing means 50 for providing stored energy to operate the boom 22 fixed in place in the lower portion 52 of the member 48. In the preferred embodiment, the energy storing means 50 comprises a gas filled elongated cylinder 54 with an upward extending elongated rod 56 that exerts an upward force designated by the letter F. This force F is used to operate the boom 22 as will be herein after described in detail. The elongated force exerting rod 56 is connected at its outer end to one end of a rectangular shaped nylon block 58. It will be noted that this block 58 has a series of identical locking steps 60 machined or cast in it. These steps 60 are used with a locking apparatus 62 in a manner that will be herein after described in detail.

As best illustrated in FIG. 3, the nylon block 58 has a rectangular shaped connecting member 64 extending from the side 66 of the block 58. This connecting member 64 is sized shaped and located to slide in an elongated slot 68 (FIGS. 2 and 5) that extends through the walls of the rectangular cross section members 47 and 48. The outer end portion 70 of the connecting member 64 is connected to the end 72 of an elongated rod 74 whose other end 76 is connected to the end 78 of a flexible chain 80. The chain 80 is fed through two closely spaced wheels 82 and 84 that have the respective axle holes 86 and 88. When assembled, the wheels 82 and 84 are positioned in the lower portion 98 of the aluminum rectangular cross section member 48 so that their axle holes 86 and 88 match up with the respective holes 102 and 100 that extend through the lower portion 98 of the member 48 and the respective holes 90a and 90b and 92a and 92b in the respective parallel spaced apart plates 92 and 96 are located so that they match the aligned respective holes 102 and 86 in the lower portion 98 and the wheel 82 and the holes 100 and 88 in the lower portion 98 and the wheel 84. An appropriate conventional shoulder bolt (not shown) is then passed through the respective holes 90a, 102, 86, 102, and 90b and secured in place by a conventional nut (not shown) and another such appropriate conventional shoulder bolt (not shown) is then passed through the respective holes 92a, 100, 88, 100, and 92b and secured in place by a conventional nut (not shown). In this manner, the lower portion 98 of the aluminum rectangular cross section member 48 is secured to the parallel plates 94 and 96 that project from and are welded to the connecting means 14 and the wheels 82 and 84 are rotatably mounted in the lower portion 98 of the member 48 with the shoulder bolts serving as axles for the wheels 82 and 84.

As illustrated in FIG. 2, the lower end portion of the chain 112 has an attached fastener 114 that is adapted to be connected to the deployment boom 22 by a conventional bolt 116 or the like at a point 118. The deployment boom 22 has an inner section 120 and an outer section 122 and a portion of the outer section 122 is hollow and is sized and shaped to receive a portion of inner section 120. A series of substantially equally spaced and sized holes 124, 126 and 128 are provided in the sides of the inner section 120 and one hole 130 is provided in the outer section 122. These respective holes 124, 126 and 128 and 130 and an associated pin 135 that is sized and shaped to fit in the holes 124, 126 and 128 and 130 allow the overall length of the deployment boom 22 to be varied by the operator to suit the operator's needs or preferences by inserting the pin in the hole 130 when it is lined up with one of the holes 124, 126 and 128. Of course, varying the overall length of the deployment boom 22 will also vary the location of the operator riding means 30 since it is attached to the outer end portion 32 of the deployment boom 22 by the pivot assembly 34. This arrangement provides means for allowing the operator to vary the length of the boom 22.

It will be noted that oppositely located cylindrical shaped substantially identical handles 136 and 138 are welded in place on the sides of the outer end portion 32 of the deployment boom 22. These handles 136 and 138 are for use by the operator to deploy the deployment boom 22 and the attached operator riding means 30. The operator can also deploy the deployment boom 22 and the attached operator riding means 30 by placing a foot on the operator riding means 30 and exerting a downward force through the foot to pull and push the operator riding means 30 and the attached deployment boom 22 to the extended in-use position.

Figure 4:
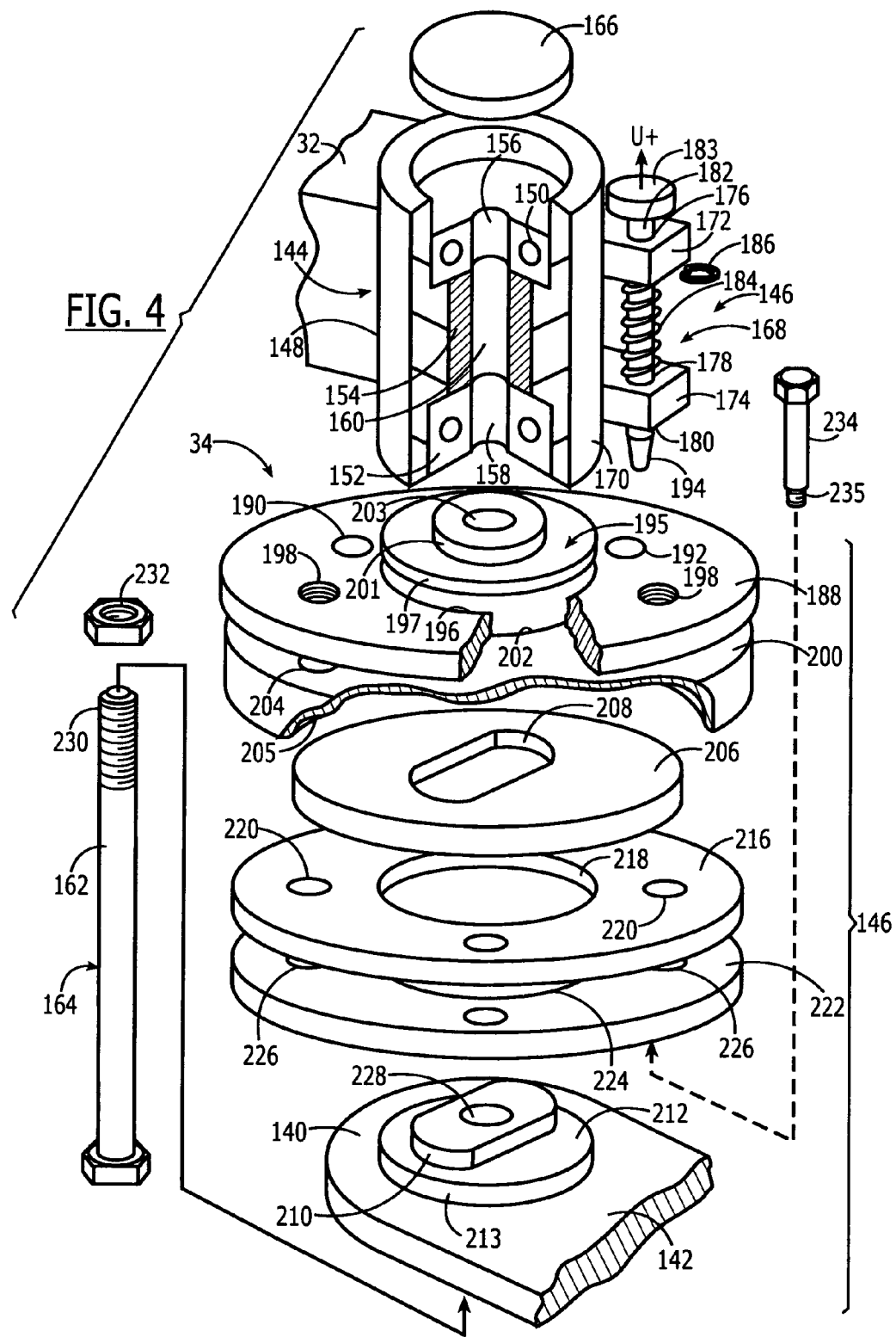
FIG. 4 is an enlarged sectional and exploded view of a portion of the structure illustrated in FIG. 2 taken within the circle 4 thereof with certain parts omitted.

The details of the pivot assembly 34 of the sulky apparatus 10 that allows the operator riding means 30 to pivot about the end portion 32 of the deployment boom 22 is illustrated in greater detail in the enlarged FIG. 4 that is partly in section and party exploded or disassembled with certain portions thereof broken away for clarity. As illustrated in FIGS. 2 and 4, the pivot assembly 34 interconnects the outer end portion 32 of the deployment boom 22 and the end portion 140 of an attaching member 142 (FIG. 4) of the operator riding means 30. As indicated, the pivot assembly 34 allows the riding means 30 to freely pivot about the outer end portion 32 of the deployment boom 22. The pivot assembly 34 also has structure for positioning the operator riding means 30 in the stored positions. Consequently, as illustrated in FIG. 4, the pivot assembly 34 includes means 144 for rotatably connecting the operator riding means 30 to the deployment boom 22 and means 146 for locating the operator riding means 30 in a stored position. The means 144 for rotatably connecting the operator riding means 30 to the deployment boom 22 comprises a hollow cylindrical shaped bearing housing 148 that contains upper and lower conventional sealed bearings 150 and 152 that are spaced apart by a hollow cylindrical shaped bearing spacer 154. The bearings 150 and 152 and the hollow cylindrical shaped bearing spacer 154 have respective circular cross section holes 156, 158 and 160 in them that are sized to receive the shaft portion 162 of the bolt 164. The upper end of the bearing housing 148 is closed by a thin circular cylindrical bearing housing cap 166 that is illustrated in its removed position.

As illustrated in FIG. 4, the means 146 for locating the operator riding means 30 in a stored position is comprises a locking pin assembly 168 that is secured to the outer surface 170 of the bearing housing 148. The locking pin assembly 168 includes two spaced apart identical upper and lower mounting projections 172 and 174 whose inner surfaces are welded to the outer surface 170 of the bearing housing 148. These upper and lower mounting projections 172 and 174 have respective circular cross section holes 176 and 178 in them that are sized to slidably receive a circular cross section cylindrical shaft 180 of a positioning pin 182 that also has an enlarged head portion 183. A compression coil spring 184 is located around the cylindrical shaft 180. This compression spring 184 exerts an upward force on a C-clip 186 that is adapted to be connected to the shaft 180 and is illustrated in its removed position in FIG. 4. Consequently, the compression spring 184 exerts an upward force U+ on the entire positioning pin 182 through the C-clip 186.

Further structure that forms part of the means 146 for locating the operator riding means 30 in a stored position is set forth in FIG. 4 below the rotatable connecting means 144 and is illustrated in its disassembled condition with certain portions thereof broken away for clarity. This means 146 for locating the operator riding means 30 in a stored position includes a thin circular locating plate 188 that has two oppositely located circular holes 190 and 192 that extend through the plate 188 and are sized and positioned to slidably receive the lower end portion 194 of the positioning pin 182. This locating plate 188 has a centrally located circular hole 196 extending through it that is sized to receive the rotatable connecting means 144 and six identical equally spaced threaded assembly holes 198 are located around the periphery of the plate 188. It will be noted that only some of these holes 198 are shown for clarity. This plate 188 is made from a suitable grade of steel.

A steel retainer 195 is illustrated just above the plate 188 and this retainer has a circular cross section cylindrical shaped lower portion 197 that has a diameter that allows the lower portion 197 to side into the hole 196 in the locating plate 188. The retainer 195 has an upper integral smaller circular cross section cylindrical portion 201 with a diameter that substantially matches the diameter of the bearing 152 and a centrally located circular cross section hole 203 extends through the retainer 195 and is sized to receive the shaft portion 162 of the bolt 164. Located just below the plate 188 is a circular cross section nylon clutch disk 200 that is thicker than the plate 188. This disk 200 has a centrally located circular hole 202 extending through it that is of the same sized as the hole 196 in the locating plate 188 and six identical equally spaced assembly holes 204 are located around the periphery of the disk 200. It will be noted that only one of these holes 204 are shown for clarity. The clutch disk 200 has a circular cross section cylindrical depression or pocket 205 in it that is sized to slidably receive two thirds of the thickness of a circular steel plate 206 that is described below.

Just below the clutch disk 200 is a smaller thin circular cross section cylindrical steel plate 206 that only has a non-circular centrally located hole 208 extending through it. This hole 208 is sized and shaped to slidably receive the upper portion 210 of a generally circular cross section cylindrical shaped bushing 212 whose lower portion 213 is welded to the outer end portion 140 of the attaching member 142 of the operator riding means 30. In the preferred embodiment, the hole 208 has a double D configuration or is shaped like a a rectangle but with partial circular end portions. However, any non-circular cross section will work for the hole 208 as long as the cross section of the upper portion 210 of a bushing 212 has a matching cross section. Located just below the plate 206, is a thin circular cross section cylindrical nylon clutch disk 216 that is substantially identical to the nylon clutch disk 200 but is not as thick as the clutch disk 200. This disk 216 has a centrally located circular hole 218 extending through it that is sized to receive the bushing 212 and six identical equally spaced assembly holes 226 are located around the periphery of the disk 216. Again, it will be noted that only some of these holes 220 are shown for clarity.

Located just below the disk 216, is a steel plate 222 that is similar to the previously described steel plate 188, but lacks any holes for the positioning pin 182. This plate 222 has a centrally located circular hole 224 extending through it that is sized to receive the bushing 212 and six identical equally spaced assembly holes 226 are located around the periphery of the plate 222. Again, it will be noted that only some of these holes 226 are shown for clarity. This plate 222 is made from a suitable grade of steel. It will be noted that the bushing 212 has a central circular hole 228 through it that allows the bolt shaft 162 to be passed through it. This hole 228 is drilled not only through the bushing 212 but also completely through the end portion 140 of the attaching member 142 so as to permit passage of the bolt shaft 162 through the attaching member 142 as well as the bushing 212.

In order to assemble the structure set forth in FIG. 4, the bushing 212 that is welded to the end portion 140 of the attaching member 142, is inserted into the holes 224, 218 and 208 with the non-circular portion 210 of the bushing 212 fitting into the non-circular hole 208 in the plate 206. The shaft 162 of the bolt 164 is then passed through the hole 228 in the bushing and through the hole 203 in the retainer 195 and through the holes 158, 160 and 156 in the respective bearing 152, spacer 154 and bearing 150. The threaded end 230 of the bolt 164 will then protrude above the bearing 150 where the nut 232 will be tightly secured to the threaded end 230. Then, the smaller bolts 234, only one is illustrated for clarity, will be inserted from below, as illustrated in FIG. 4, into the holes 226, 220, 204 and 198 in the respective disks or plates 222, 216, 200 and 188 and the threaded portion 235 of the bolts will be tightly screwed into the threaded holes 198 in the locating plate 188. The bearing housing cap 166 will be replaced to complete the assembly of the structure set forth in FIG. 4. It will be noted that the shaft 162 of the bolt 164 and the hole 228 through the bushing 212 and the end portion 140 of the attaching member 142 are sized so that the bolt shaft 162 is a press fit in the hole 228 and hence the bolt shaft 162 is fixed in the hole 228 and is not able to rotate.

In view of this arrangement set forth in FIG. 4, possible breakage or damage of the positioning pin 182 is prevented when the positioning pin 182 is located in one of the locking holes 190 or 192 in the locating plate 188 and a blow or the like is delivered to the operator riding means 30. This is because the force of the blow to the operator riding means 30 will be transmitted to the attaching member 142 and the bushing 212 and to the non-circular portion 210 of the bushing 212 that fits into the non-circular hole 208 in the plate 206 which will cause the plate 206 to turn, but the plate 206 is located in the cavity or pocket in 205 in the clutch disk 200 and this cavity 205 is sized to slidably receive a portion of circular steel plate 206 and this clutch disk pocket 205 allows the steel plate to rotate rather than transmit any force from the blow or the like from the operator riding means 30. Consequently, no force is transmitted to the positioning pin 182 that could damage the positioning pin 182.

Figure 5:
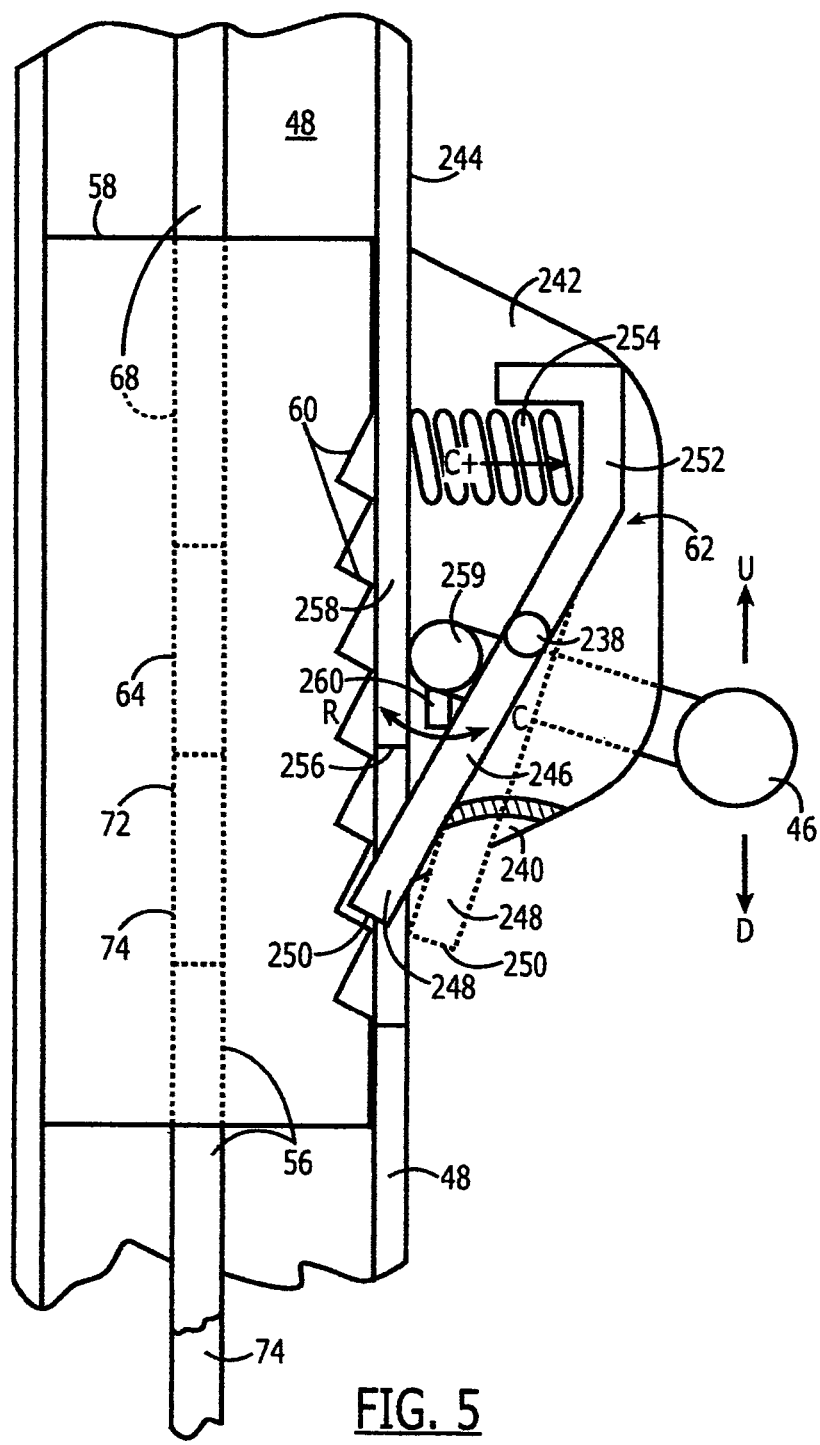
FIG. 5 is an enlarged side elevational view with certain portions broken away of a portion of the controls for the sulky apparatus that are located within the circle 5 and taken in the direction of the arrow 5 in FIG. 2.

The details of how the nylon block 58 and its machined or cast steps 60 function are illustrated in the enlarged view set forth in FIG. 5. FIG. 5 illustrates in greater detail the locking apparatus 62 that was previously illustrated in FIG. 2 and FIG. 3. As illustrated in FIG. 5, this locking apparatus 62 is connected by a pin 238 or the like to two substantially identical mounting members 240 (that is partially broken away) and 242 that are welded to and project outwardly from the outer surface 244 of the hollow rectangular cross section member 48. As illustrated, the locking apparatus 62, includes an engaging member 246 that is pivotally mounted on the pin 238 that is mounted in and extends outward from the mounting member 242. This engaging member 246 has a flat end portion 248 whose end tip 250 is shaped, adapted and located to engage the teeth 60 on the nylon block 58 and lock the block 58 in place within the tube 48. The other end portion 252 of the engaging member 246 is bent to fit around an outward force exerting coil spring 254 that exerts an outward force labeled C+ on the associated end portion 252 of the engaging member 246 and this forces the end tip 250 to engage the teeth 60 of the block 58. An opening 256 is present in the outer wall 258 of the tube 48 and the flat end portion 248 extends through this opening 256. As illustrated in FIG. 5, the operating handle 46 has a straight circular cross section portion 259 and this straight circular cross section portion 259 has an integral outwardly extending rectangular shaped projection 260 that is located adjacent the flat end portion 248 of the engaging member 246.

In view of this arrangement, downward pressure or force from the hand of the operator, represented by the letter D on the handle 46 causes its straight circular cross section portion 259 to rotate clockwise as represented by the letter R and as a consequence the integral outwardly extending rectangular shaped projection 260 also rotates in the direction R and allows the end portion 250 of the flat end portion to engage a tooth of the teeth 60 of the block 58 as illustrated in FIG. 5 by the solid lines. Conversely, when the handle 46 is pushed upward by the operator's hand, as represented by the letter U, the handle 46 causes its straight circular cross section portion 259 to rotate counterclockwise as represented by the letter C and this causes integral outwardly extending rectangular shaped projection 260 to push against the flat end portion 248 to cause the flat end portion to move to the dashed line position in FIG. 5 so that its end portion 250 no longer engages any of the teeth 60 on the block 58. Due to the movement of the end portion 250 to the dashed line position, the block 58 is free to move upward and will move upward automatically due to any force exerted by the connected elongated rod 56 that is connected to the gas cylinder 54.

Figure 6:
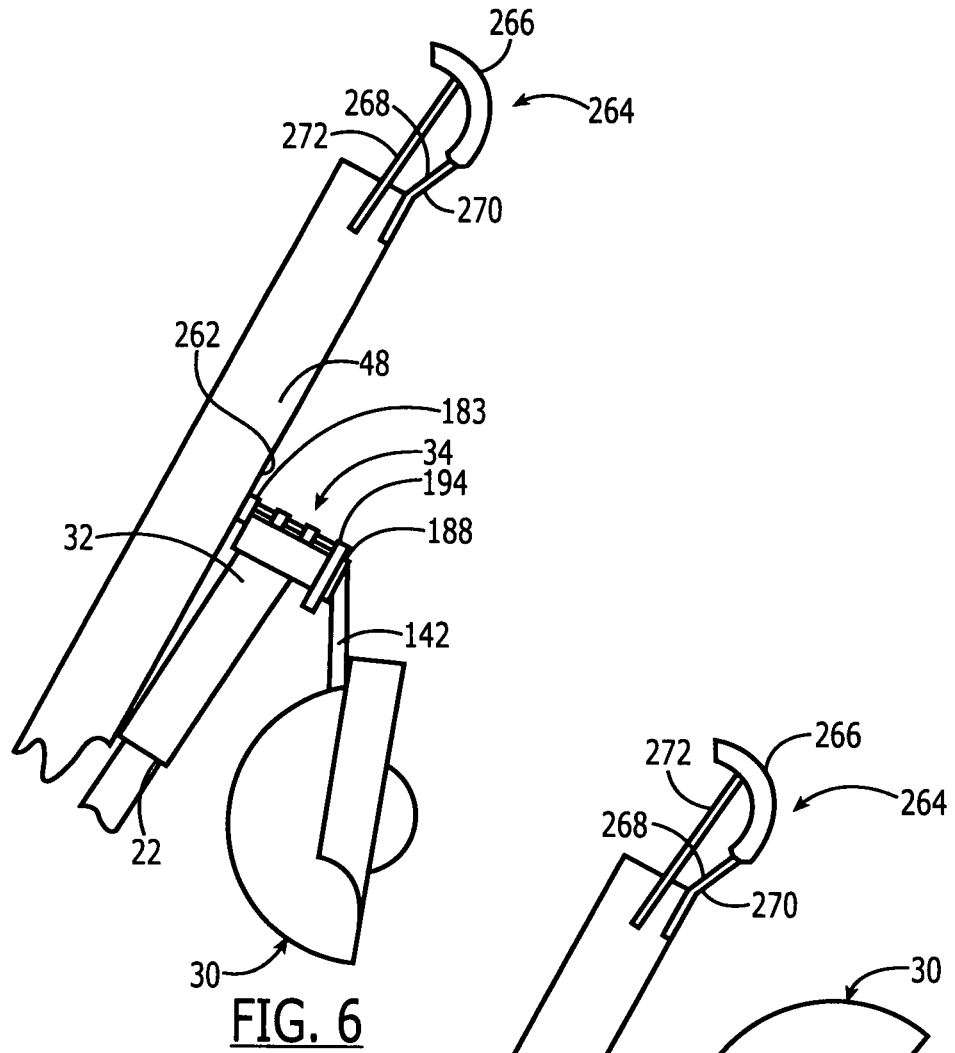
FIG. 6 is a side elevational view of a portion of the sulky apparatus invention with certain details omitted illustrating one of the invention's storage modes.
Figure 7:
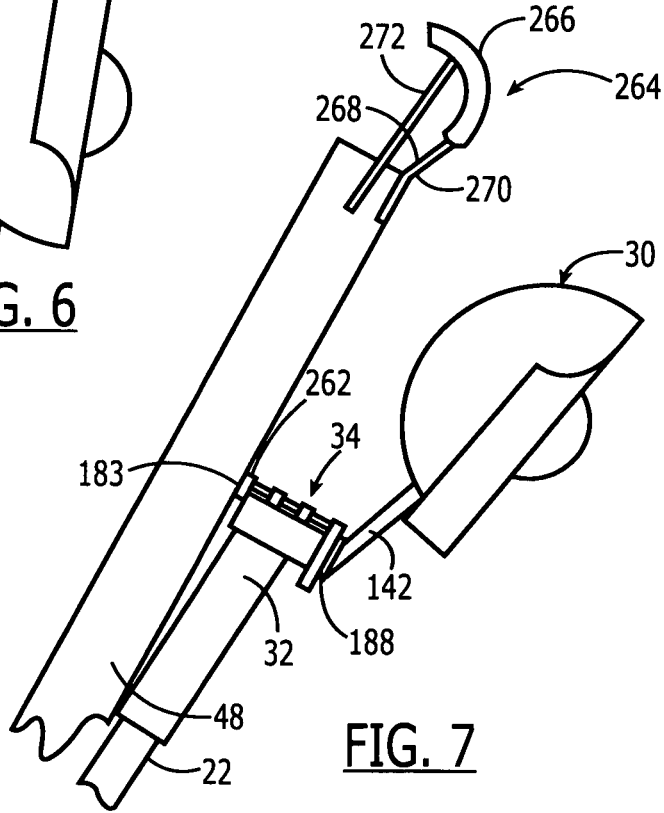
FIG. 7 is a side elevational view of a portion of the sulky apparatus invention with certain details omitted illustrating the invention's other storage mode.

FIGS. 6 and 7 illustrate the operator riding means 30, the pivot assembly 34 and portions of the attached deployment boom 22 in their retracted or stored positions. In FIGS. 6 and 7 it will be noted that the handles 136 and 138 have been omitted for clarity. FIG. 6 illustrates the more usual storage position for the operator riding means 30 and that is with the circular shaped mounting plate 188 that is attached to the end portion 140 of the attaching member 142 rotated so that the operator riding means 30 is extended in a downward direction. In this stored position, the sulky operator riding means 30 is stored out of the way so that the operator can conveniently walk behind the lawn mower 12 while performing standard mowing operations and is also readily available for deployable use by an operator. This storage position is made possible in view of the construction of the pivot assembly 34 that was discussed in connection with FIG. 4. As indicated in connection with FIG. 4, the upper end portion of the positioning pin 182 has an enlarged head portion 183 and the spring 184 biases the positioning pin 182 upward or outward so that the lower end portion 194 of the positioning pin 182 is prevented from entering the holes 190 or 192 in the mounting plate 188. However, when the operator riding means 30 and the attached pivot assembly 34 are retracted to the retracted or stored position in FIG. 6, the head portion 183 of the positioning pin 182 contacts the outer surface of the elongated hollow rectangular cross section aluminum member 48 at the point 262 and the head portion 183 is pushed toward the rotatable mounting plate 188.

As previously indicated, with respect to FIG. 4, the mounting plate 188 has two oppositely located circular holes 190 and 192 extending through the outer periphery of the mounting plate 188 and these holes 190 and 192 are sized and located to receive the end portion 194 of the positioning pin 182 and consequently when the head portion 183 is pushed it pushes the end portion 194 of the positioning pin 182 into one of the holes 190 or 192 depending on the position of the rotatable mounting plate 188. In this case, with the operator riding means 30 in a downward position, the end portion 194 of the positioning pin 182 would be pushed into the hole 192 to lock the plate 188 in place and hence the operator riding means 30 is locked in place to prevent the operator riding means 30 from swinging or moving from this storage position during mowing operations.

FIG. 7 illustrates another storage position for the operator riding means 30 and that is with the circular shaped mounting plate 188 that is attached to the end portion 140 of the attaching member 142 rotated so that the operator riding means 30 is extended in an upward direction. As previously indicated, the positioning pin 182 has an enlarged head portion 183 and the spring 184 biases the positioning pin 182 upward or outward so that the lower end portion 194 of the positioning pin 182 is prevented from entering the holes 190 or 192 in the mounting plate 188. However, when the operator riding means 30 and the attached pivot assembly 34 are retracted to the retracted or stored position in FIG. 7, the head portion 183 of the positioning pin 182 contacts the outer surface of the elongated hollow rectangular cross section aluminum member 48 at the point 262 and the head portion 183 is pushed toward the rotatable mounting plate 188. As indicated previously, the mounting plate 188 has two oppositely located circular holes 190 and 192 extending through the outer periphery of the mounting plate 188 and these holes 190 and 192 are sized and located to receive the end portion 194 of a positioning pin 182 and consequently when the head portion 183 is pushed it pushes the end portion 194 of the locking pin 182 into one of the holes 190 or 192 depending on the position of the rotatable mounting plate 188. In this case, with the operator riding means 30 in an upward position, the end portion 194 of the positioning pin 182 would be pushed into the hole 190. This position, with the operator riding means 30 in a upward position can be preferred when the sulky apparatus 10 and the attached mower or the like 12 are being transported.

As illustrated in FIGS. 1 and 6 and 7, the sulky apparatus 10 is provided with safety means 264 for protecting an operator of the sulky apparatus 10 from injury in the event that the sulky apparatus or the attached self-propelled equipment 12 strikes an object or comes to an abrupt stop. The safety means 264 includes a rectangular shaped curved cushion member 266 that is attached to the rear edge of the upper end of the elongated hollow rectangular cross section aluminum member 48 by a hinge member 270 that permits the cushion member 266 to pivot about the upper end of the member 48. An elongated shock absorbing member 272 has one end connected to the back of the curved cushion member 266 and the other end is connected to the side of the elongated hollow rectangular cross section member 48. Consequently, this curved cushion member 266 is in position to contact the upper portion of an operator in the event that the sulky apparatus 10 and the attached self-propelled equipment 12 strike an object or comes to an abrupt stop. When this occurs and the operator is thrown forward and the upper portion of an operator contacts the curved cushion member 266, the cushion member 266 can pivot forward toward the lawn mower or the like 12 and the attached elongated shock absorbing member 272 will absorb some of the force of the impact of the operator with the curved cushion member 266.

The sulky apparatus 10 is made from conventional materials using conventional techniques known in the art. Except where indicated, the metal components of the sulky apparatus are made from common cold rolled steel using conventional milling, broaching, cutting and drilling and forming techniques. The gas filled elongated cylinder 54 is a Gas Spring No. GGS203-090-K available from H. A. Gudden Industries and other suppliers. The shock absorbing member 272 is a Gas Spring No. GGS-22-060-K also available from H. A. Gudden Industries and other suppliers. The chain 80 is a common motorcycle type chain that is cut to a suitable length.

The sulky apparatus 10 is used in the following manner. Normally, the sulky apparatus 10 would be transported in the storage position illustrated in FIG. 7 or possibly FIG. 6 with the operator riding means 30 stored out of the way. The position illustrated in FIG. 7 offers the advantage of allowing the sulky apparatus 10 to be transported in a more compact configuration than the position set forth in FIG. 6. In order to use the sulky apparatus 10, the operator needs to pull the operator riding means 30 from its stored position illustrated in FIG. 6 or FIG. 7. This is accomplished by the operator manually pulling down on the handle 136 or 138 (FIG. 2) or by the operator using a foot to pull down the operator riding means 30 in the previously described manner. This downward pulling force results in not only the operator riding means 30 being pulled down, but also the attached deployment boom 22 as illustrated in FIGS. 1 and 2 as well as the chain 112 that is attached to the boom 22. With the control handle 46 in the engaged downward position D, as illustrated in FIG. 5, the end tip 250, as indicated in the solid lines, of the engaging member 246 engages the teeth 60 on the block 58 and consequently, when the operator stops the downward pulling force on the operator riding means 30 and the attached deployment boom 22, the boom 22 and the attached operator riding means 30 will stop in one of the downward positions illustrated by the dashed lines in FIG. 1 depending upon which tooth 60 was engaged by the end tip 250 of the engaging member 246 of the locking apparatus 62 illustrated in FIG. 5.

When the operator steps onto the operator riding platform 40 the operator's body weight will automatically cause the boom 32, the chain 80, the connecting member 74, the nylon block 58, and the elongated rod 56 of the gas filled cylinder 54 to all move in a downward direction allowing the teeth 60 to slip past and not be engage by the end portion 250 of the engaging member 246. This allows the operator riding means 30 to rest upon and follow the terrain conditions since the downward travel of the operator riding means 30 is unrestricted. At the same time, upward pull do to the force of the gas filled cylinder 54 is prevented since any upward movement of the block 58 is prevented by the engagement of the end tip 250 with the upper surface of one of the teeth 60 of the block 58 when the handle 46 is in the down or D position. With the handle 46 in this down D position, the operator can operate the sulky apparatus 10 and the attached lawn mower 12 in a conventional manner without the gas filled cylinder 54 being able to exert an upward pulling force to attempt to pull the chain 80 and the boom 32 and the operator riding means 30 upward.

If the operator wants to change the vertical position of the operator riding means 30, the operator merely steps off of the riding platform 40 and manually moves control handle 46 to the non-engaged position, represented by the letter U in FIG. 5, so that the end tip 250 of the engaging member 246 will not engage the teeth 60 on the block 58 as represented by the dashed lines.

As illustrated in FIG. 2, the operator riding means 30 is capable of freely pivoting about the attached boom 22 as the operator riding means 30 is in use in view of the previously described rotatable connecting means 144. When the operator is done with the operator riding means 30, the operator steps off the operator riding means 30 and moves the control handle 46 to the non-engaged position, indicated by the letter U, to cause the integral outwardly extending rectangular shaped projection 260 to rotate in the direction C and push the flat end portion 248 to the dashed line position in FIG. 5 so that its end portion 250 no longer engages any of the teeth 60 on the block 58. As a consequence, due to the movement of the end portion 250 to the dashed line position, the block 58 is free to move upward and will tend to move upward due to the force exerted by the connected elongated rod 56 that is attached to the gas filled cylinder 54 which results in an upward force being applied to the chain 112 that tends to pull the attached boom 22 and the connected operator riding means 30 upward. However, the operator riding means 30 must be rotated horizontally with respect to the attached boom 22 toward the inner section 120 of the boom 22 to allow the upward force from the gas filled cylinder 54 to pull the boom 22 and the attached operator riding means 30 upward. Otherwise, with the operator riding means extended outward the force from the gas filled cylinder 54 is insufficient to pull the boom 22 and the attached operator riding means 30 upward. As the connected operator riding means 30 is moving upward, it will automatically move, due to gravity, to the downward storage position illustrated in FIG. 6. However, if the operator wants to move the operator riding means 30 to the storage position illustrated in FIG. 7, the operator must manually pull outward on the operator riding means rotate the operator riding means 30 to the upward storage positions illustrated FIG. 7 and then release the operator riding means 30.

It should be noted that the operator can use the operator riding means 30 with the handle 46 in the upward or U position with the operator riding means 30 extending outward and in this position the operator riding means 30 will remain in the extended or deployed position. However, gas filled cylinder 54 will exert an upward force on the operator riding means 30 that will tend to cushion the ride or feel of the operator riding means 30 that the operator experiences. This cushioning effect is desired by many operators As illustrated in FIG. 6 and FIG. 7, the operator riding means 30 can be rotated so that the attaching member 142 of the of the operator riding means 30 extends downward as illustrated in FIG. 6 or the operator riding means 30 can be rotated so that the attaching member 142 of the of the operator riding means 30 extends upward as illustrated in FIG. 7. In either position as previously indicated, the enlarged head portion 183 of the positioning pin 182 contacts the member 48 at a point 262 and this results in a force being exerted on the head portion 183 of the positioning pin 182 that pushes the positioning pin 182 outward away from the member 48 and into one of the holes 190 or 192 in the previously described locating plate 188.

As previously indicated with respect to FIG. 4 the positioning pin 182 will not be damaged by an inadvertent blow or the like to the operator riding means 30. The positioning pin 182 is protected due to the previously described clutch structure set forth in FIG. 4. Consequently, a blow or the like to the operator riding means can not be transmitted to the positioning pin 182.

Although the invention has been described in considerable detail with reference to a certain preferred embodiment, it will be understood that variations or modifications may be made within the spirit and scope of the invention as defined in the appended claims.

What is claimed is:

1. Sulky apparatus for use behind a self-propelled operator controlled machine having controls comprising operator riding means for supporting an operator behind the self-propelled machine, a control column having an upper end portion and a lower end portion adapted to be located with the upper end portion in the vicinity of the controls of the self-propelled machine with at least a portion of the control column being hollow, a deployment boom attached to the operator riding means for deploying the operator riding means to an operational position and for retracting the operator riding means to a stored position, the deployment boom having an inner end portion and an outer end portion and wherein the operator riding means is connected to the outer end portion of the deployment boom and the inner end portion of the deployment boom is pivotally connected to the lower end portion of the control column, and control means having at least a portion thereof located within the hollow portion of the control column for controlling the operation of the deployment boom associated with the control column.

2. The sulky apparatus of claim 1 wherein the control means for controlling the operation of the deployment boom also includes a chain.

3. Sulky apparatus for use behind a self-propelled operator controlled machine having controls comprising operator riding means for supporting an operator behind the self-propelled machine, a control column having an upper end portion and a lower end portion adapted to be located with the upper end portion in the vicinity of the controls of the self-propelled machine, a deployment boom attached to the operator riding means for deploying the operator riding means to an operational position and for retracting the operator riding means to a stored position, the deployment boom having an inner end portion and an outer end portion and wherein the operator riding means is connected to the outer end portion of the deployment boom and the inner end portion of the deployment boom is pivotally connected to the lower end portion of the control column, and control means for controlling the operation of the deployment boom associated with the control column and the control means includes means for operating the deployment boom in different modes and one of the modes includes automatically retracting the deployment boom when the operator steps off of the operator riding means.

4. The sulky apparatus of claim 3 wherein one of the modes includes allowing the deployment boom to remain extended when an operator steps off of the operator riding means.

5. Sulky apparatus for use behind a self-propelled operator controlled machine having controls comprising operator riding means for supporting an operator behind the self-propelled machine, a control column having an upper end portion and a lower end portion adapted to be located with the upper end portion in the vicinity of the controls of the self-propelled machine, a deployment boom attached to the operator riding means for deploying the operator riding means to an operational position and for retracting the operator riding means to a plurality of stored positions, the deployment boom having an inner end portion and an outer end portion and wherein the operator riding means is connected to the outer end portion of the deployment boom and the inner end portion of the deployment boom is pivotally connected to the lower end portion of the control column, and control means for controlling the operation of the deployment boom associated with the control column.

6. The sulky apparatus of claim 5 wherein the operator riding means is pivotally connected to the outer end portion of the deployment boom by a pivot assembly and the pivot assembly includes the means for locating the operator riding means in a plurality of stored positions.

7. The sulky apparatus of claim 6 wherein the pivot assembly includes a clutch disc.

8. Sulky apparatus for use behind a self-propelled operator controlled machine having controls comprising operator riding means for supporting an operator behind the self-propelled machine, a control column having an upper end portion and a lower end portion adapted to be located with the upper end portion in the vicinity of the controls of the self-propelled machine, a deployment boom attached to the operator riding means for deploying the operator riding means to an operational position and for retracting the operator riding means to a stored position, the deployment boom having an inner end portion and an outer end portion and wherein the operator riding means is connected to the outer end portion of the deployment boom and the inner end portion of the deployment boom is pivotally connected to the lower end portion of the control column, control means for controlling the operation of the deployment boom associated with the control column, and means for locating the operator riding means in a plurality of storage positions with one of the storage positions being where the operator riding means is secured for being transported.

9. Sulky apparatus for use behind a self-propelled operator controlled machine having controls comprising operator riding means for supporting an operator behind the self-propelled machine, a control column having an upper end portion and a lower end portion adapted to be located with the upper end portion in the vicinity of the controls of the self-propelled machine, a deployment boom attached to the operator riding means for deploying the operator riding means to an operational position and for retracting the operator riding means to a stored position, the deployment boom having an inner end portion and an outer end portion and wherein the operator riding means is connected to the outer end portion of the deployment boom and the inner end portion of the deployment boom is pivotally connected to the lower end portion of the control column, control means for controlling the operation of the deployment boom associated with the control column and safety means for protecting an operator in case the self-propelled machine being used with the sulky apparatus should strike an object including a cushion member attached to the upper end portion of the control column.

10. The sulky apparatus of claim 9 wherein the safety means also includes a shock absorbing member attached to the upper end portion of the control column and the cushion member.

* * * * *